Figure 1:
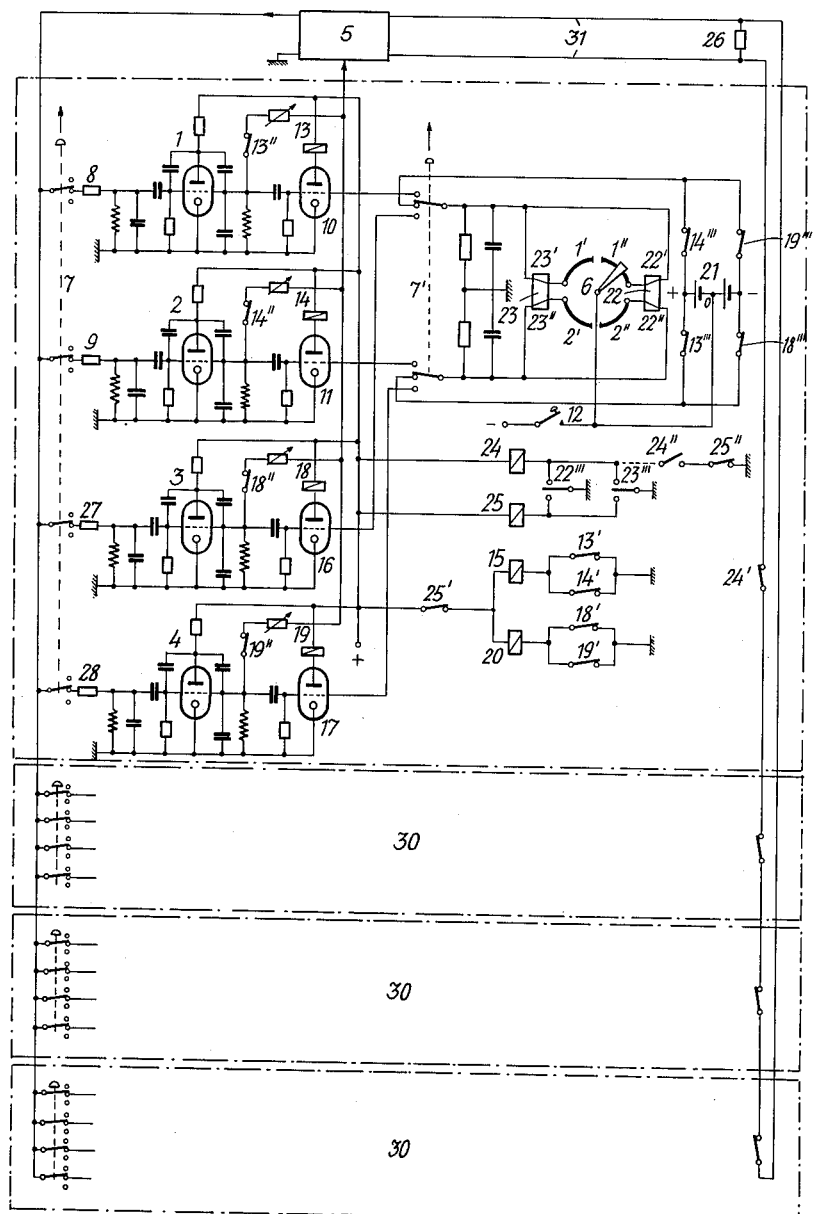

INVENTORS:
LUDWIG TSCHIRF
BY  FRITZ GÄRTNER
FRANZ JANOVSKY

AGENT.

July 3, 1962 L. TSCHIRF ETAL 3,042,170
METHOD AND APPARATUS FOR CONTROLLING ANY DESIRED NUMBER
OF INDIVIDUAL MOVEMENTS OF A MECHANICAL DEVICE
Filed Nov. 18, 1958 2 Sheets-Sheet 2
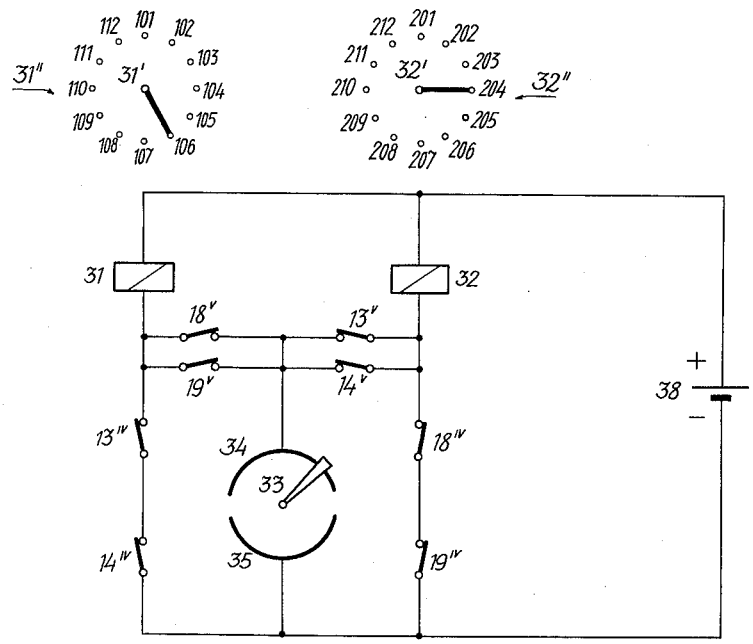
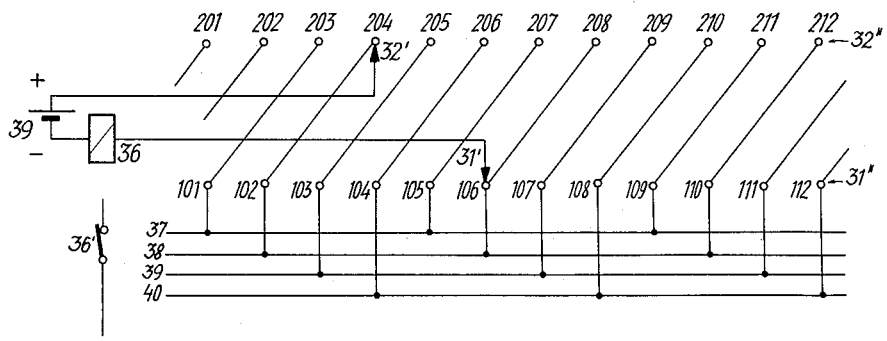
INVENTORS:
LUDWIG TSCHIRF
FRITZ GÄRTNER
FRANZ JANOVSKY
BY Karl F. Ross
AGENT.

United States Patent Office 3,042,170
Patented July 3, 1962

3,042,170
METHOD AND APPARATUS FOR CONTROLLING ANY DESIRED NUMBER OF INDIVIDUAL MOVEMENTS OF A MECHANICAL DEVICE
Ludwig Tschirf, Fritz Gärtner, and Franz Janovsky, Vienna, Austria, assignors to Maschinenfabrik Heid Aktiengesellschaft, Vienna, Austria
Filed Nov. 18, 1958, Ser. No. 774,665
Claims priority, application Austria Nov. 20, 1957
19 Claims. (Cl. 192—142)

In addition to other methods, the so-called impression type of automatic control (see W. Schmid, "Automatologie," C. Hauser, Munich, 1952) is used for the automatic control of mechanical devices, particularly of production machines. In this type of control an electric oscillation of a predetermined frequency is associated with each control command to be performed. During the first cycle of operations, which is controlled by hand, these electric oscillations are impressed upon a storage means. The control commands thus stored can then be read from the storage means and fed to the control elements for performing additional, similar cycles.

To ensure a perfect performance of the stored cycle during playback it is essential that the relation of the speeds of all individual movements to each other and to the speed of the storage means is always the same during recording and playback. Whereas measures are known which ensure a constant speed ratio between the speed of the storage means and one movement of the mechanical device, the known methods are unsatisfactory when several individaul movements of the mechanical device, which are independent of each other and subject to random speed changes, are to be controlled and synchronized by a single storage means.

The invention relates primarily to a system for controlling any desired number of individual movements of a mechanical device by several control-signal sequences received from a signal-storage means, each of the individual movements being chronologically divided into increments which are recorded in the storage means. It is an object of the invention to re-establish the synchronism of all these individual movements even if individual movements have been disturbed.

The system according to the invention is characterized in that during playback the occurrence time of the increments is compared with the occurrence time of the recordings associated therewith and that, in the case of any difference between said occurrence times, the individual movement concerned or/and the read-out rate of the control signal sequence are changed in such a sense as to re-establish a coincidence of the occurrences of the increments and of the recordings and that the mechanical device is stopped, if desired, when the difference between the read-out increments recorded in the storage means and the performed increments of the individual movement exceeds a predetermined value.

Another measure provided by the invention resides in that, upon a change of the read-out rate of a control-signal sequence, a change of equal magnitude is effected with respect to all other control-signal sequences so that the storage means functions as a coordinator of the individual movements controlled by it. For instance, in the case of a disturbance which causes an individual movement to fall out of step, the storage means will correct this disturbance either directly or indirectly by varying the read-out rate of the storage means and with it the speeds of all other individual movements until they have been coordinated with the disturbed movement. Alternatively, both corrections may be combined.

According to the invention the coincidence is re-established by accelerating or decelerating the individual movements or the pick-up rate of the storage means.

Various methods are available for carrying out the invention. Conventional storage means may be used for storing the control-signal sequences. Storage means having moving record carriers are particularly suitable, such as magnetic tapes, perforated tapes or photographic tapes. The control signals for several individual movements are recorded in parallel tracks on a single tape or the recordings may be superimposed on a single track if different recording techniques are used.

According to the invention, wave or pulse trains of predetermined duration but of alternatingly different kind, e.g. of different frequency, amplitude, etc., are used for recording the successive increments of movement. This means that the first increment of the movement is recorded, e.g., with a frequency $f_1$, the second with a frequency $f_2$, the third again with $f_1$ etc. When it is required to control forward and reverse movements of one and the same mechanical device, such as the movement of a rotary shaft in different directions of rotation, a second pair of frequencies $f_3$, $f_4$ for recording the reverse movement will be used in addition to the first pair of frequencies $f_1$, $f_2$ or the direction of rotation will be reversed by an electromechanical means when the movement in one direction has reached a predetermined position so that the movement in the reverse direction can be controlled again by $f_1$, $f_2$. The same applies also to the control of additional individual movements of any desired direction as well as to the reversing of an individual movement.

The electromechanical means may be a galvanic switch, a capacitive switch or an inductive switch and the switch paths may be arranged in a circle, along a straight line or otherwise.

In an apparatus which is applicable in conjunction with the method according to the invention an electromechanical device is provided for each individual movement and is actuated by said movement to connect at least two electrical wave or pulse generators in succession to the recording input of the storage means.

As has already been mentioned, this electromechanical means may consist of an electrical switch which during the preparation of the control program, i.e., during the initial recording of the control-signal sequences, causes the same to be impressed on the storage means.

The apparatus for carrying out the method according to the invention, which has been described hereinbefore, is also a subject matter of the invention and is characterized in that during the playback of the electric signal sequences recorded in the signal storage means an electromechanical device, such as a switch for establishing the coincidence of the increments of the individual movement with the signal sequences from the storage means, is provided whose switch paths are associated each with one stored increment, each switch path being divided into two sections to which two different switch elements are connected which, in the case of need for a correction of the individual movements relative to the read-out rate of the signal sequences, effect the correction in different senses depending on the section over which a pick-up means coupled with the individual movement and belonging to the electromechanical device is then disposed, and that counters for the two kinds of performed increments are provided, if desired, to operate an electrical releasing device for stopping the mechanical device if the difference between the counts exceeds a predetermined value.

To facilitate the understanding of the invention an illustrative embodiment will be described hereinafter with reference to the drawing. Further features of the invention may be taken from the following description. It may be stated at this point that the invention is not restricted in scope by the individual elements of the apparatus described here, such as the rotary switch referred to or the special type of the wave generators disclosed because a man skilled in the art will recognize that elements of any other known type may be used.

FIG. 1 shows the basic circuit diagram for controlling individual movements of a mechanical device. Left- and right-hand rotary movements have been chosen by way of example. The rotary movements may be mechanically transformed into movements of any desired form. FIG. 2 shows a circuit diagram of a stopping device using electromechanical counters and operative in the case of a disturbance in the control device; and FIG. 3 is a developed view showing the connection of the contact paths of the counters.

The coordinator (FIG. 1) is represented by the magnetic-tape recording and reproducing device 5. In the first cycle of operations, which is controlled by hand, the increments of a right-hand individual movement are stored by alternately recording alternating electric voltages having the frequencies $f_1$ and $f_2$ produced by the oscillators 1, 2 on the magnetic tape. The alternate recording of the two voltages is effected by the contact finger 6 of the rotary switch, which finger moves in unison with the individual movement and wipes on segments 1', 1", 2", 2'. The movement of the contact finger on the segments divides the mechanical movement into increments which have associated with them the magnetizations of the magnetic tape at $f_1$ and $f_2$. It may be assumed first that the space between segments 1" and 2" or 1' and 2' is as wide as the contact finger so that the segments will not be bridged.

The alternating voltage $f_1$ produced by the oscillator 1, FIG. 1, is associated with the conductively connected segment pair 1', 1" and the alternating voltage $f_2$ produced by the oscillator 2 is associated with the segment pair 2', 2". After the desired direction of rotation has been selected with the direction switch 7, 7' (which is to be shifted, e.g., in the direction of the arrow for right-hand rotation) the oscillators are rendered operative by a reduction in the attenuation of their grid circuits by the disconnection of the resistors 8 and 9 with the aid of the switch 7. At the same time the grids of the two electron tubes 10 and 11 are connected by the switch 7' to the segments 1', 1" and 2', 2", respectively, of the rotary switch. Depending on the position of the finger 6 the actuation of the start key 12 causes a negative blocking voltage to be applied through the switch 7' to the grid of one of the tubes 10, 11, whereby this tube is deenergized and the circuit-breaking relay 13 or 14 drops out to close the contact 13' or 14' whereby a magnetic clutch 15 is caused to start the drive of the individual movement. This causes the finger 6 to begin its rotation whereby the relays 13 and 14 are alternately energized and deenergized and their normally closed contacts 13" and 14" alternately apply the electric oscillations from the oscillators 1 and 2 to the input of the tape recorder. Thus, the increments on the tape recorder are associated with the increments determined by the width of the segments 1', 1" and 2', 2". To record a movement in the opposite direction (left-hand rotation) the direction switch 7, 7' is shifted opposite to the direction of the arrow. In a manner analogous to that described hereinbefore this causes the operation of the oscillators 3 and 4 at the frequencies $f_3$ and $f_4$ and of the electron tubes 16 and 17, the relays 18 and 19 with their contacts 18', 18" and 19', 19" and the magnetic clutch 20 (for left-hand rotation).

The electrical and mechanical components used for recording are also utilized to a large extent for controlling the following cycles with the aid of the magnetic tape.

During playback, the tube stages 1, 2, 3, 4, which were previously used as oscillators, function as resonance amplifiers for the frequencies $f_1$ to $f_4$ and the clutch 7, 7' is in its intermediate position. This causes the output signal of the tape reproducer to be applied through switch 7 to the control grids of these tube stages. The low-resistance output of the tape reproduced prevents the tube stages from becoming self-oscillating. At the same time the segments 1' and 1" and the segments 2', 2" are connected by switch 7' to the outer terminals of an auxiliary current source 21, the center tap of which is connected to the contact finger 6. The two auxiliary circuits include the normally closed (break) contacts 13''', 14''' of the relays 13 and 14 and the contacts 18''' and 19''' of relays 18 and 19, respectively.

For instance, if the tape reproducer produces alternately oscillations having the frequencies $f_1$, $f_2$ for right-hand rotation these frequencies will alternately block the detector stages 10 and 11 through the resonance amplifiers 1 and 2. This causes the alternate deenergization of the relays 13, 14, which alternately permit their break contacts 13''', 14''' to close whereas the break contacts 18''' and 19''' (which are effective only for left-hand rotation) remain constantly open. At the same time the contacts 13' and 14' are alternatingly closed so that the magnetic clutch 15 maintains the right-hand rotation as long as the tape reproducer delivers one of the two frequencies $f_1$ and $f_2$.

The finger 6 rotating at the same time permits now a comparison between the increments of the individual movement and the associated increments on the magnetic tape. The corrector will become operative when the synchronism is disturbed.

If a lead of the individual movement causes the contact finger 6 to contact the segment 2" at a time when the magnetic tape still delivers the frequency $f_1$, a circuit will be closed which extends from the positive terminal of the auxiliary current source 21 through the contact 13''', which is still closed, the winding 22" of the polarized relay 22, the segment 2" and the contact finger 6. The relay 22 then closes at its contact 22''' the circuit for the clutch-disengaging relay 25, which operates its contact 25' to deenergize the clutch 15. This causes a temporary interruption of the individual movement so that the synchronism between the increments of the individual movement and of the magnetic tape is reestablished.

When a lag of the individual movement causes the contact finger 6 to be still on the segment 1" when the magnetic tape already delivers the frequency $f_2$, a circuit will be closed which extends from the positive terminal of the auxiliary current source 21 through the contact 14''', which is already closed, the winding 22' of the polarized relay 22, the segment 1" and the contact finger 6. The relay 22 operates its contact 22''' to close the circuit for the braking relay 24 of the tape reproducer. This relay opens the contact 24' to insert a series resistor 26 into the motor circuit 31 of the tape reproducer. The resulting reduction in tape speed will then reestablish the synchronism between the individual movement and the magnetic tape.

Because the magnetic tape can only be moderately braked rather than completely stopped and the reduction in speed is relatively gradual rather than sudden, it may not be possible to re-coordinate the increments of the individual movements with those of the magnetic tape within a single correction zone if a substantial displacement between said increments has occurred so that a constant displacement remains. This can be varied by providing a current path which extends through the holding contact 24" of the tape-reproducer-braking relay 24 and the interrupting contact 25" of the clutch-disengaging relay as indicated by dash lines in FIG. 1. As soon as the magnetic tape is braked by the relay 24 the latter locks by means of its contact 24" until a lead of the individual movement causes the opposite correction command to be given so that the clutch-disengaging relay 25 opens the holding circuit at the contact 25" to terminate the braking of the magnetic tape.

If the magnetic tape delivers alternately oscillations at the frequencies $f_3$, $f_4$ for left-hand rotation, the other part of the circuit, which is of similar design, becomes operative in a manner analogous to that for right-hand rotation. This other part of the circuit comprises the components 3, 4, 16, 17, 18, 19, 20, 27, 28 etc. The role of segment 1' is now taken by segment 2''. The role of winding 22' of relay 22 is taken by winding 23' of relay 23 whereas the winding 23'' of relay 23 takes the role of winding 22'' of relay 22.

A correction is always required when the contact finger 6 is on the segment pair 1', 1'' (2', 2'') associated with the frequency $f_1$ ($f_2$) at a time when the magnetic tape delivers the frequency $f_2$ ($f_1$). The magnetic tape must be braked if the finger is leaving the segment range and the individual movement must be braked if the finger enters said range. These mutually inconsistent requirements are compiled with by dividing the segment range associated with the frequency $f_1$ ($f_2$) into two halves 1' and 1'' (2', 2'') and connecting the segment halves to different windings 23' and 22' (23'' and 22'') of the polarized relay 22 and 23. Only a single finger and a single segment arrangement are required for left-hand and right-hand running if the direction of current flow in the relays 22 and 23 is reversed in accordance with the direction of rotation. For right-hand rotation the circuit from the positive terminal of the auxiliary current source to the center tap and for left-hand rotation the circuit from the negative terminal to the center tap is closed.

The circuits shown in block form for additional individual drives 30 are equal to the system described hereinbefore in construction and mode of operation and are similarly connected to the tape recording and reproducing device.

To enable the use of smaller control steps the sequence of the segments 1', 1'', 2'', 2' may be repeated several times at the periphery of the patch of the finger. In this case the switch paths or segments having the same reference characters must be connected in parallel.

The control steps will also be reduced if the contact finger is wider than the space between the segments 1'' and 2'' or 1' and 2' so that the segments are bridged. In this case the frequencies $f_1$, $f_1$ and $f_2$ (mixed frequencies), $f_2$, $f_2$ and $f_1$ (mixed frequencies) etc. are successively fed to the magnetic tape. The occurrence of the mixed frequencies then represents additional increments so that the number of increments per revolution of the contact finger tis doubled. During playback any coordination between the individual movements is effected, if required, in the manner described hereinbefore when the contact finger is on one of the segments 1', 1'', 1'' or 2'. If the contact finger 6 bridges, e.g., the segments 1'', 2'' and the magnetic tape delivers at the same time the appertaining frequencies $f_1$ and $f_2$ the contacts 13''' and 14''' of relays 13 and 14 will be closed at the same time. Two currents of equal magnitude will then flow from the positive terminal of battery 21 through elements 13''', 7', 22'', 2', 6 and 0 and through elements 14''', 7', 22', 1'', 6 and 0, so that the polarized relay 22 is magnetized in opposite senses and remains in its intermediate position and a correction is not effected. If frequency $f_1$ or $f_2$ is absent in the bridging range because the magnetic tape is leading or lagging relative to the contact finger 6, only one of the contacts 13''' and 14''' will be closed. The relay 22 will then be energized only through one of the two windings 22' or 22'' and will cause the individual movements to be coordinated with the magnetic tape in the manner described hereinbefore.

Whereas the previously described arrangement for effecting the correction enables only a reduction of the magnetic-tape speed or an uncoupling of the individual movement, the synchronism may also be established by a simultaneous change of the speed of both parts, e.g., if an additional contact of each of relays 24, 25 is included in the circuit in such a manner that the clutch-disengaging relay 25 when energized switches by its additional contact the magnetic tape to a higher speed and the tape-reproducer-braking relay 24 when energized switches by its additional contact the individual drive to a higher speed. The latter may be effected in such a manner that the additional contact of the relay 24 energizes an additional clutch, which causes by known means an increase of the speed of the individual movement. Variable speed motors, hydraulic motors, infinitely variable gears, change gears and the like may be used instead of clutches for transmitting the individual movements and may be controlled by the relay 25 with the aid of known additional elements in a manner analogous to the one described hereinbefore.

In order to prevent a falsification of the working cycle during playback or a damage to the controlled mechanical device in the case of a failure of the control device it is desired to stop the mechanical drive of the entire installation by a stopping device in this case. This is achieved according to the invention by the use of two electromechanical counters, one of which counts constantly the number of bridgings of the segments by the rotating finger whereas the second counts at the same time those increments of the magnetic tape on which $f_1$ and $f_2$ are simultaneously stored (i.e., the number of mixed-frequency areas). When the control functions are working satisfactorily there will not be a permanent difference between the steps counted by the counters. Only during a correction (braking of the magnetic tape or disengaging of the clutch) a difference of one step will temporarily occur. If the control device is disturbed, e.g., because a tube or a clutch has failed or a displacement occurs which is so large that a coordination by one or more entire widths of a segment would result, the two counters will show a difference of two or more counted steps. This indicates an unsatisfactory operation of the control and will cause appropriate switching steps to stop the entire installation. The same effect can be achieved in a similar manner by using a differential counter rather than the two individual counters.

One of the possible embodiments of the stopping device will be described with reference to the circuit shown in FIG. 2. The counters are constructed like the known rotary selectors so that a current pulse in the winding of the counter coil 31 or 32 will cause a contact arm 31' or 32' wiping over the contacts 101 to 112 or 201 to 212, respectively, to advance one step to the next contact. The number of contacts must be divisible by four; this may be achieved by the provision of blank areas, if necessary. A contact finger 33, which is mechanically connected rigidly to the contact finger 6 of FIG. 1, wipes over two segments 34 and 35. The segment 34 is associated with the frequency $f_1$, the segment 35 is associated with the frequency $f_2$. The contacts $13^{IV}$, $13^V$ and $14^{IV}$, $14^V$ are operated by the relays 13 and 14 and the contacts $18^{IV}$, $18^V$ and $19^{IV}$, $19^V$ are operated by the relays 18 and 19 of FIG. 1. As long as no frequency is delivered by the magnetic tape and the relays 13, 14, 18 and 19 are energized, all relay contacts of FIG. 2 are opened. When the relays 13 and 14 are alternately deenergized during, for instance, right-hand rotation by the arrival of frequencies $f_1$ and $f_2$, the circuit from the positive terminal of the current source 38 through elements 31, $13^{IV}$, $14^{IV}$ to the negative terminal is closed during each increment with mixed frequencies $f_1$ and $f_2$ to cause the counter 31 to advance one count. During each bridging of segments 34, 35 by the finger 33 the counter 32 will also advance one count because a circuit is closed from the positive terminal of the current source 38 through elements 32, $13^V$ and $14^V$, 34, 33, 35 to the negative terminal of the source of current. For instance, if the bridging of arcs 34, 35 precedes the joint closing of contacts $13^{IV}$ and $14^{IV}$, the counter 32 will advance by one count more than the counter 31. This is compensated as soon as the counter 31 is energized through contacts $13^{IV}$, $14^{IV}$ when the mixed frequencies occur. When the joint closing of contacts $13^{IV}$, $14^{IV}$ precedes the bridging of arcs 34, 35 by the finger 33, the counter 31 will advance by one more count. This will be compensated as soon as the bridging occurs. If a defect in the control means causes the finger 33 to lag behind the increments of the magnetic tape to such an extent that the magnetic tape delivers mixed frequencies twice without occurrence of a bridging of segments 34, 35, by the finger 33, a difference of two counts will occur. This difference will also occur when the magnetic tape lags by two bridging steps.

FIG. 3 shows in a developed view the two contact paths 31″ and 32″ of the counters 31 and 32 and the through-connections between the contacts associated with each other. If the contact arm 31′ leads or lags the contact arm 32′ by two steps (as is indicated in FIG. 3) a circuit will be closed which extends from the positive terminal of current source 39 through the contact arms 32′, 31′ and the stopping relay 36 to the negative terminal of the current source. The relay 36 operates a contact 36′ to deenergize the drive of the mechanical device.

To change the direction of rotation for left-hand rotation the counters are controlled by the contacts $18^{IV}$, $18^V$, $19^{IV}$ and $19^V$ of the relays 18 and 19 of FIG. 1 in a manner which is analogous to that during right-hand rotation with the difference that the counter 31 counts now the number of bridgings and the counter 32 counts the number of increments with mixed frequencies $f_1$ and $f_2$. When the right-hand rotation ceases, e.g., just at the time when the magnetic tape delivers the frequency $f_1$ whereas the leading finger 33 already bridges the segments 34, 35, the counter 32 has made one count more than the counter 31. If the movement is continued in the same sense of rotation after an interval, the difference between the counts will be compensated as has been described hereinbefore. On the other hand, if the further movement is in the opposite direction (left-hand rotation) the counter 31, which counts the bridgings of segments 34, 35 during left-hand rotation on account of the crosswise arrangement of the contacts, is fed with current from the positive terminal of the current source 38 through elements $18^V$, 34, 33, 35 to the negative terminal, whereby the difference between the counts is compensated.

What we claim is:

1. A method of controlling the motion of a driving mechanism in response to signals recorded on a storage medium, comprising the steps of dividing the advance of said mechanism into an alternation of first and second increments, assigning a first and a second control signal to said first and second increments, respectively, recording said first and second control signals on said medium upon the occurrence of corresponding increments of advance in an initial run of said mechanism, subsequently recovering from said medium at a predetermined rate a succession of first and second control signals thus recorded, advancing said mechanism by increments of displacement determined exclusively by said control signals, thereby producing a re-run substantially in conformity with said initial run, producing first and second reference signals respectively matching said first and second control signals during corresponding increments of advance of said mechanism in the course of said re-run, comparing the reference signals thus produced with the simultaneously recovered control signals, producing an error signal upon the occurrence of a disparity of at least a predetermined magnitude between the compared signals and compensating for deviations of said re-run from said initial run by temporarily altering the relationship between the advance of said mechanism and the rate of recovery of the recorded signals upon the occurrence of said error signal.

2. A method according to claim 1 wherein said relationship is altered by a stopping of said mechanism upon the coincidence of a leading portion of a reference signal with a non-matching control signal and by a slowdown of said rate of recovery upon the coincidence of a trailing portion of a reference signal with a non-matching control signal.

3. A method according to claim 1 wherein said first and second signals are oscillations of different frequencies.

4. A method according to claim 1, further comprising the steps of counting the number of alternations between first and second control signals as recovered from said medium, simultaneously counting the number of alternations between first and second reference signals as produced during said re-run, and discontinuing operations upon the two counts differing by a predetermined value.

5. A method according to claim 4 wherein, upon a reversal in the direction of advance of said mechanism, the count of control-signal alternations during advance in one sense is added to the count of reference-signal alternations during advance in the opposite sense, and vice versa.

6. An apparatus for controlling the motion of a driven element, comprising a storage medium having first and second control signals alternately recorded thereon, first and second detector means respectively responsive to said first and second control signals, first drive means for advancing said recording medium at a predetermined rate past said first and second detector means, second drive means adapted to displace said driven element at a predetermined speed, actuating means independently controlled by the output of said first and second detector means for rendering said second drive means operative upon the occurrence of either of said control signals, signal-generator means coupled with said second drive means for producing a succession of first and second reference signals alternating in step with said first and second control signals upon correct synchronization of said first and second drive means, signal-comparison means jointly controlled by said signal-generator means and by said first and second detector means for producing an output in response to coincidence of either of said first and second control signals with a differently numbered reference signal, and control means responsive to said output for temporarily modifying the operation of at least one of said drive means in a manner restoring substantial synchronism between said first and second control signals and correspondingly numbered reference signals.

7. An apparatus according to claim 6 wherein said signal-generator means comprises a rotary switch and relay means controlled by said first and second detector means, said relay means being provided with first and second contacts respectively closed upon the occurrence of said first and second control signals, said control means being provided with a first energizing circuit completed in certain positions of said rotary switch via said closed first contacts and with a second energizing circuit completed in other positions of said rotary switch via said closed second contacts.

8. An apparatus according to claim 7 wherein said control signals are waves of different frequencies, said first and second detector means comprising amplifier circuits respectively tuned to said frequencies, further comprising recording means connectable to said amplifier circuits during an initial run of said driven element for storing said waves on said medium, and means including said rotary switch for alternately placing said amplifier circuits in an oscillatory condition during said run.

9. An apparatus for controlling the motion of a driven element, comprising a storage medium having first and second control signals alternately recorded thereon, first and second detector means respectively responsive to said first and second control signals, first drive means for advancing said recording medium at a predetermined rate past said first and second detector means, second drive means adapted to displace said driven element at a predetermined speed, actuating means independently controlled by the output of said first and second detector means for rendering said second drive means operative upon the occurrence of either of said control signals, signal-generator means coupled with said second drive means for producing a succession of first and second reference signals alternating in step with said first and second control signals upon correct synchronization of said first and second drive means, signal-comparison means jointly controlled by said signal-generator means and by said first and second detector means for producing a first output in response to coincidence of a leading portion of either of said reference signals with a differently numbered control signal and a second output in response to coincidence of a trailing portion of either of said reference signals with a differently numbered control signal, first control means responsive to said first output for temporarily modifying the operation of at least one of said drive means in a manner accelerating the rate of advance of said recording medium relative to the motion of said driven element, and second control means responsive to said second output for temporarily modifying the operation of at least one of said drive means in a manner retarding the rate of advance of said recording medium relative to the motion of said driven element.

10. An apparatus according to claim 9 wherein said first control means comprises switch means for arresting said second drive means.

11. An apparatus according to claim 9 wherein said second control means comprises normally short-circuited impedance means in the input of said first drive means and switch means for temporarily removing the short circuit therefrom.

12. An apparatus according to claim 9 wherein one of said control means is provided with holding means for maintaining itself operated upon an initial actuation by said signal-comparison means, the other of said control means having contacts for inactivating said holding means.

13. An apparatus according to claim 9 wherein said signal-generator means comprises a rotary switch with at least four contact segments and a wiper successively engageable with said segments, said first control means including first relay means energizable via either of two non-adjacent ones of said segments, said second control means including second relay means energizable via either of two other non-adjacent ones of said segments.

14. An apparatus according to claim 13 wherein said signal-comparison means further comprises a first and a second differential relay each having two windings, said windings being connected to respective pairs of adjacent segments, each of said differential relays being provided with contacts for alternatively energizing said first and second relay means in dependence upon the energization of a respective one of its own windings.

15. An apparatus according to claim 9, further comprising first counter means controlled by said signal-generator means for counting the number of alternations of said reference signals, second counter means controlled by said first and second detector means for counting the number of alternations of said control signals, and stopping means controlled by said first and second counter means for arresting said second drive means in response to a predetermined difference between the respective counts thereof.

16. An apparatus according to claim 15 wherein said first and second counter means comprises a first and a second stepping switch respectively provided with first and second bank contacts, each of the bank contacts of one of said stepping switches being connected to a higher-order bank contact and a lower-order bank contact of the other stepping switch, said stopping means being provided with an operating circuit including the contacts thus interconnected.

17. An apparatus according to claim 15 wherein said signal-generator means comprises a rotary switch provided with a plurality of contact arcs and a wiper adapted to bridge adjacent arcs, said first counter means being provided with an operating circuit closed in the arc-bridging position of said wiper.

18. A method of controlling the motion of a mechanical element, comprising the steps of recording on a storage medium a succession of control signals corresponding to successive increments of displacement in accordance with a predetermined program, recovering from said medium at a predetermined rate a succession of control signals thus recorded, advancing said element in dependence upon said program by increments of displacement determined exclusively by said control signals, thereby producing a succession of reference signals substantially matching the succession of control signals recovered from said medium, comparing the reference signals with the recovered control signals and producing an error signal upon the occurrence of a disparity of at least a predetermined magnitude between the compared signals indicative of a lagging of the rate of recovery of said control signals behind the advance of said element, and temporarily discontinuing the advance of said element upon the occurrence of said error signal.

19. An apparatus for controlling the motion of a mechanical element, comprising a storage medium having a succession of control signals corresponding to successive increments of said motion in accordance with a predetermined program recorded thereon, detector means responsive to said control signals, first drive means for advancing said recording medium at a predetermined rate past said detector means, second drive means adapted to displace said element at a predetermined speed, signal-generator means coupled with said second drive means for producing a succession of reference signals substantially matching the succession of control signals, signal-comparison means jointly controlled by said signal-generator means and by said detector means, and stop means operable by said signal-comparison means for temporarily inactivating said second drive means upon the occurrence of a disparity of predetermined magnitude between the control signals sensed by said detector means and the reference signals produced by said signal-generator means, said second drive means being non-responsive to any disparity between said reference signals and said control signals less than said predetermined magnitude.

References Cited in the file of this patent
UNITED STATES PATENTS

| | | |
|---|---|---|
| 2,866,145 | Peaslee et al. | Dec. 23, 1958 |
| 2,882,476 | Wetzel | Apr. 14, 1959 |
| 2,887,638 | Cail et al. | May 19, 1959 |
| 2,937,365 | Peaslee | May 17, 1960 |